UNITED STATES PATENT OFFICE.

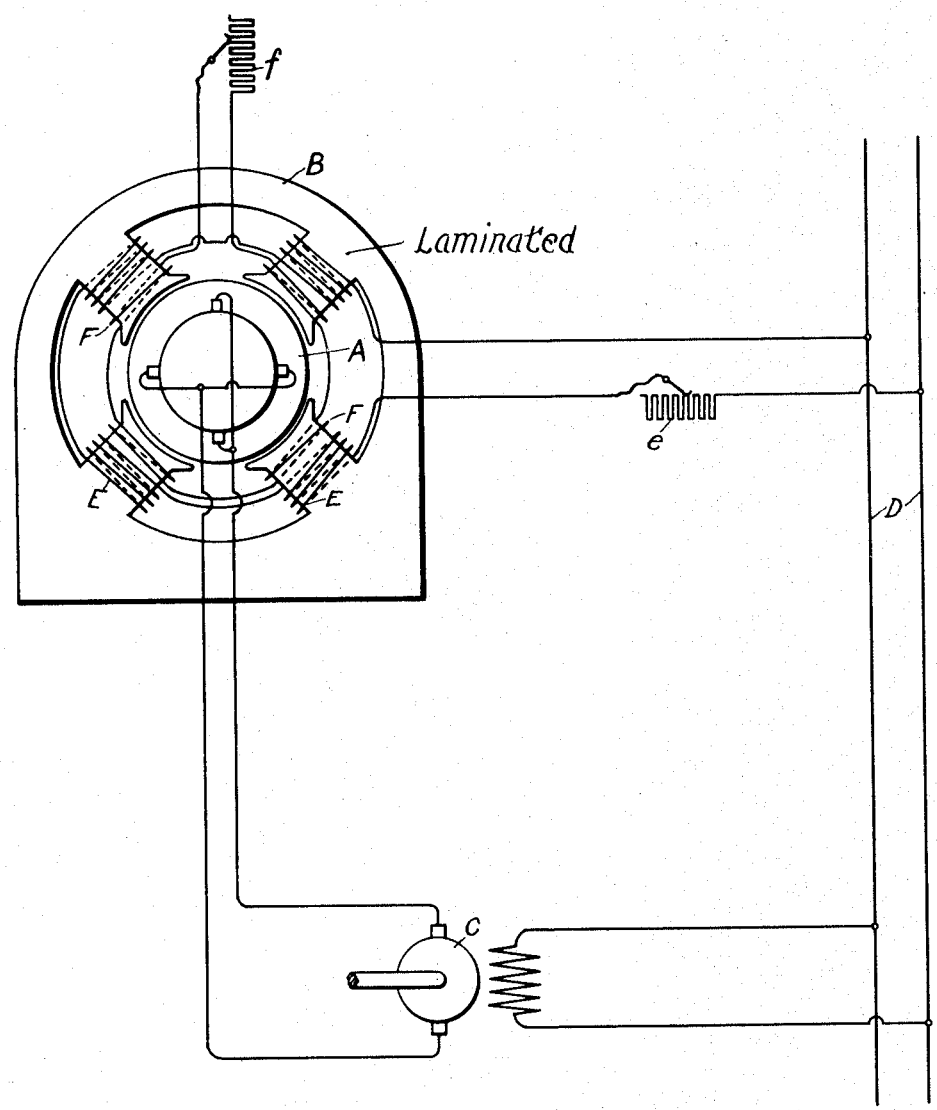

KARL A. PAULY, OF SCHENECTADY, NEW YORK, ASSIGNOR TO GENERAL ELECTRIC COMPANY, A CORPORATION OF NEW YORK.

DYNAMO-ELECTRIC MACHINE.

No. 873,778.  Specification of Letters Patent.  Patented Dec. 17, 1907.

Application filed May 18, 1907. Serial No. 374,423.

*To all whom it may concern:*

Be it known that I, KARL A. PAULY, a citizen of the United States, residing at Schenectady, county of Schenectady, State of New York, have invented certain new and useful Improvements in Dynamo-Electric Machines, of which the following is a specification.

My invention relates to separately-excited generators provided with means for varying the generator field-strength, so as to vary the voltage impressed on motors supplied by the generator.

It is well known in the art that if the voltage supplied to a motor is increased too rapidly, excessive rushes of current are produced, which are objectionable, while if the generator voltage is decreased too rapidly, the motor, if shunt wound or separately excited, will return current to the generator. In order to prevent a too rapid change of the voltage, controlling switches have been especially arranged heretofore so that their rate of movement is limited.

My invention consists in making the control wholly automatic by a proper arrangement of the generator itself. I accomplish this result by providing means for adjusting the magnetic time-lag of the generator,—that is, the length of time required after a certain increase or decrease of generator field-current for the magnetism of the generator to reach a correspondingly increased or decreased amount. A suitable arrangement for securing the desired result consists in providing a short-circuited winding on the generator field-pole with a variable resistance included on the short-circuit. This winding acts as a short-circuited secondary for the field-flux, and retards any variation in the amount of the flux. In order that the desired adjustment may not be interfered with by short-circuited currents other than those in the short-circuited winding itself, the field magnet should be laminated.

My invention will best be understood by reference to the acompanying drawing, which shows diagrammatically a separately-excited generator arranged in accordance with my invention, for supplying an electric motor.

In the drawing, A represents the armature, and B the laminated field structure of the generator. The armature A supplies the motor-armature C. The line-wires D represent a separate source of current for the generator field-winding E, and this same source may be employed for supplying a constant excitation of the motor field. A variable resistance or rheostat $e$ is placed in circuit with the generator field-winding, so as to vary the strength of the generator field, and consequently the voltage supplied to the motor. A winding F of a few turns is placed on the generator poles, and is short-circuited through a variable resistance $f$. The purpose of this resistance is to adjust the resistance of the short-circuit. This short-circuit acts to retard a variation in the field-flux, and the amount of the retardation is determined by the resistance of the short-circuit. By a proper adjustment of the resistance $f$, the desired maximum rate of change in the voltage supplied to the motor may be secured; so that regardless of the rate at which the resistance $e$ is cut out of or into the field-circuit of the generator, the rate of variation of the voltage supplied to the motor never exceeds a predetermined amount, and excessive rushes of current are avoided.

It will be understood that I have illustrated my invention diagramatically, and that in practice any well-known forms of apparatus may be employed.

What I claim as new and desire to secure by Letters Patent of the United States is,—

1. In combination, an electric generator, an electric motor supplied thereby, a separate source of current for the generator field winding, means for varying the field current of said generator, and means for adjusting the magnetic time-lag of the generator field.

2. In combination, an electric generator, an electric motor supplied thereby, a separate source of current for the generator field winding, means for varying the field strength of the generator, a short-circuited winding on the generator field structure, and a resistance included in the short-circuit.

3. In combination, an electric generator, an electric motor supplied thereby, a separate source of current for the generator field winding, means for varying the field-strength of the generator, a short-circuited winding on the generator field structure, and means for varying the resistance of the short-circuit.

4. In combination, an electric generator having laminated field-poles, an electric motor supplied thereby, a separate source of current for the generator field winding, means for varying the field-strength of said generator, a short-circuited winding surrounding the generator field-poles, and a resistance included in the short-circuit.

5. In combination, an electric generator having laminated field poles, an electric motor supplied thereby, a separate source of current for the generator field winding, means for varying the field-strength of said generator, a short-circuited winding surrounding the generator field-poles, and a resistance included in the short-circuit.

In witness whereof, I have hereunto set my hand this 16th day of May, 1907.

KARL A. PAULY.

Witnesses:
BENJAMIN B. HULL,
HELEN ORFORD.